United States Patent [19]
Walsh et al.

[11] 3,986,433
[45] Oct. 19, 1976

[54] LAP MILLING MACHINE

[75] Inventors: Thomas A. Walsh, Fountain Valley; Alan E. Strasbaugh, Seal Beach, both of Calif.

[73] Assignee: R. Howard Strasbaugh, Inc., Long Beach, Calif.

[22] Filed: Oct. 29, 1974

[21] Appl. No.: 518,498

[52] U.S. Cl. .............................. 90/15 A; 51/33 R; 90/31; 90/32
[51] Int. Cl.² ........................................ B23C 3/16
[58] Field of Search ...................... 90/15 A, 31, 32; 51/33 R, 33 W

[56] References Cited
UNITED STATES PATENTS

| | | | |
|---|---|---|---|
| 2,297,551 | 9/1942 | Greve | 90/15 A |
| 2,599,759 | 6/1952 | Gunning et al. | 90/31 X |
| 2,633,675 | 4/1953 | Ellis | 51/33 R |
| 2,660,930 | 12/1953 | De Vlieg et al. | 90/15 A X |

*Primary Examiner*—Othell M. Simpson
*Assistant Examiner*—Z. R. Bilinsky
*Attorney, Agent, or Firm*—Howard L. Johnson

[57] ABSTRACT

A programmable machine for automatically cutting and/or resurfacing a selected arcuate pattern upon either a convex or concave lap, particularly such laps as may then be used for forming and polishing opthalmic lenses. A lap positioning unit and a cutter positioning unit are located respectively on adjacent upright and horizontal supports so as to bring the lap and cutter into mutual engagement, each unit initially being longitudinally adjustable from a respective pivot point by a selected amount so as to determine the particular arcuate curvature obtained, which curvatures jointly form the two-dimentional arcuate pattern chosen for the lap face. In operation, the lap is oscillated vertically and a rotary milling cutter is driven back and forth transverse thereto. Each unit is associated with a longitudinal cam plate or guide of distally converging taper, the opposite edges of which serve to jog a contact roller which triggers a corresponding reversing switch, thus automatically limiting the length of swing of the particular unit. The arcuate stroke length of the oscillating lap and of the cutter are thus correlated with the amount of displacement from the particular pivot point.

To change between concave and convex work surfaces, the lap-carrying unit and the cutter-carrying unit may each be rotated 180° on their respective axes so that when brought together again each faces the opposite direction. An electric motor drives the rotary milling cutter, the oscillatory movements of the positioning units being effected hydraulically, and electric programming means enabling the machine to continue the set pattern to the end of a run and then return to starting position before shutting itself off, thus enabling an operator to replace successive workpieces (laps) in a series of such machines operating in sequential cycles.

14 Claims, 10 Drawing Figures

LAP MILLING MACHINE

BACKGROUND OF THE INVENTION

Laps used in opthalmic lens making have a surface curvature (typically either spherical or else toroidal—the latter often called cylindrical) which lap curvature is reproduced or transferred to the surface of a lens blank by rubbing the face of the lap against the lens piece until the lens is worn down to exact conformity with the configuration of the lap, such process taking place in the presence of an intervening film of flowable abrasive material.

Such laps are initially obtained by starting with a small number of cast iron laps, each of a considerably different curvature. A set of identical models of each such type are then shaped to an individually different but related curvature by means of a lap shaping machine. Thus, starting with say 24 different casting types, a final total of say 2400 different laps may be provided, each different to some extent from the other and each thus capable of producing a different lens. After such finished lap is used on five or six successive lens blanks, it is usually resurfaced by the same lap shaping machine. By the past shaping machines, the work on a raw casting may require 30 minutes; resurfacing may be done in about five minutes.

Conventional lap shaping machines are based on oscillating a narrow, slanted, chisel-like scraper which is moved in an arcuate path across the lap face, with the lap itself being moved perpendicular thereto. Correlation of the two movements may be by worm gear and ratchet mechanism or the like; the length of stroke is determined by eccentric means manually set for each job, and the whole operated by a source of rotary power which can even be provided by a hand crank. Such devices are satisfactory only because they have been used for many years and nothing better is available for contrast. In particular, since cross strokes of the cutter-chisel are typically effected by an eccentric drive, the cutter speed across the stroke length is non-uniform and varies with the changing position of the eccentric mechanism; also, and angularly disposed point cutter functions only in one direction, that is on the forward half of its cycle.

BRIEF STATEMENT OF THE INVENTION

Accordingly it is an object of the invention to provide a constant-speed lap shaping machine which is essentially automatic in operation, which can be set for a great diversity of patterns—both concave and convex—, which will run through the set pattern in a fraction of the former required time and will then shut itself off after returning to the starting position, is safer in operation, has amplified calibration, automatically adjusts the stroke length to the longitudinal displacement (curvature) of the workpiece, and can also be readily adjusted to compensate for a known thickness of a wire mesh or similar overlay which it may be desired subsequently to use on the finished lap.

In contrast to the prior scraping cutters, the present device employs a rotary milling cutter which is believed broadly new for such use. Such a rotary cutter with two or three flutes cuts faster and more efficiently than a scraper and functions while moving in both directions of its cycle, while at the same time its transverse oscillating, carrying arm travels much slower (and hence produces much less vibration) than the corresponding carrying arm for the scraper.

Both the lap carrying unit and the cutter carrying unit (each of which are borne on projecting support arms disposed perpendicular to each other) are longitudinally displaceable relative to their particular pivot or swivel point in setting the required parameters of lap curvature, and in each instance the unit is associated with displacement-compensating means, e.g. longitudinal guide means typified by a cam plate with distally converging contact edges, which serves to diminish the stroke length progressively as its initial displacement increases from the pivot point. Contact with or activation by the cam edge is made by sensory means such as rollers dependent from the respective sides of the oscillating arms thus triggering direction-reversing switches. In addition, the upright pivot point together with the cutter-carrying arm is selectively displaceable as a unit along the longitudinal track.

By the present milling machine, a raw lap can be surfaced in five minutes compared to the previous 30 minutes, and can be resurfaced in 20 to 60 seconds compared to five minutes.

STRUCTURAL FEATURES

Figure 3:
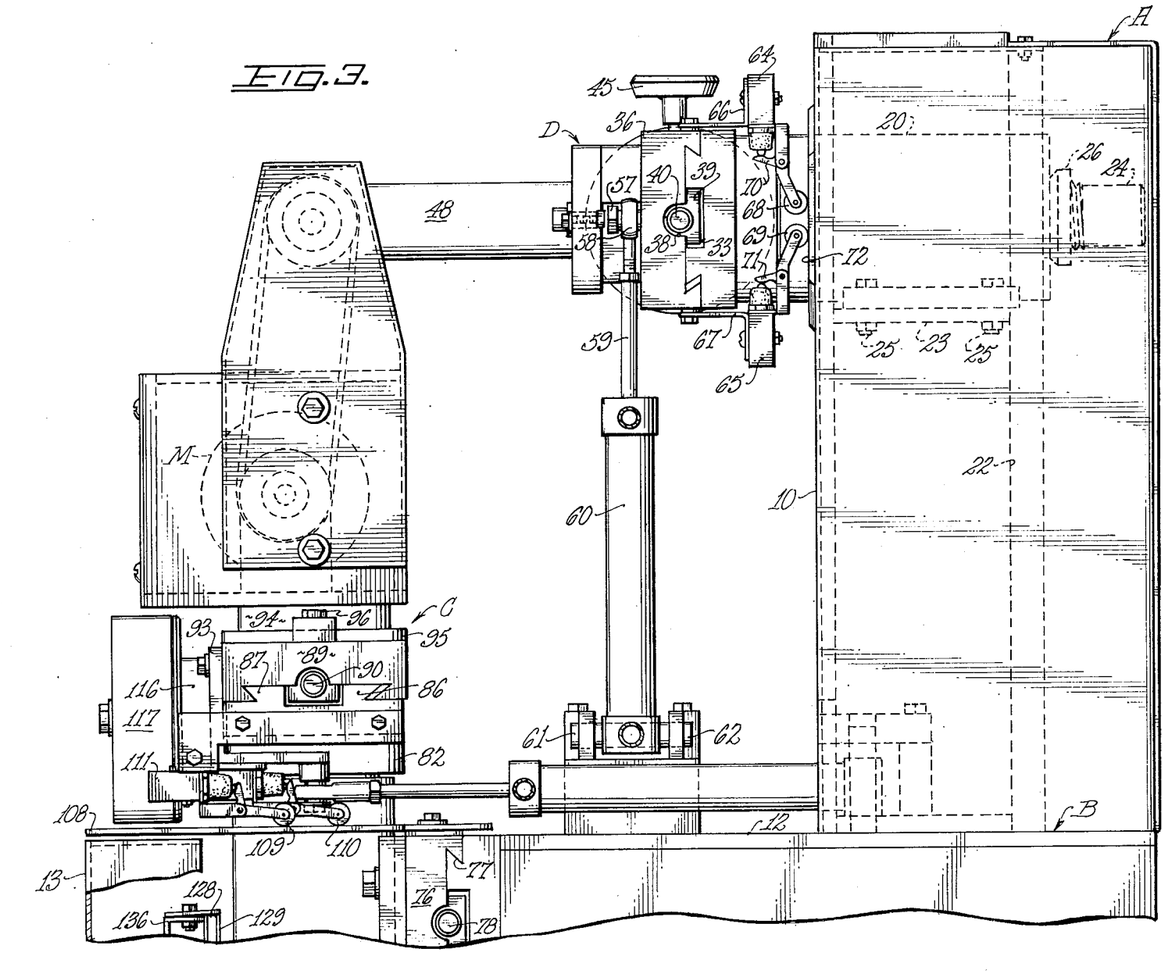
FIG. 3 is a rear elevational view thereof.
Figure 4:
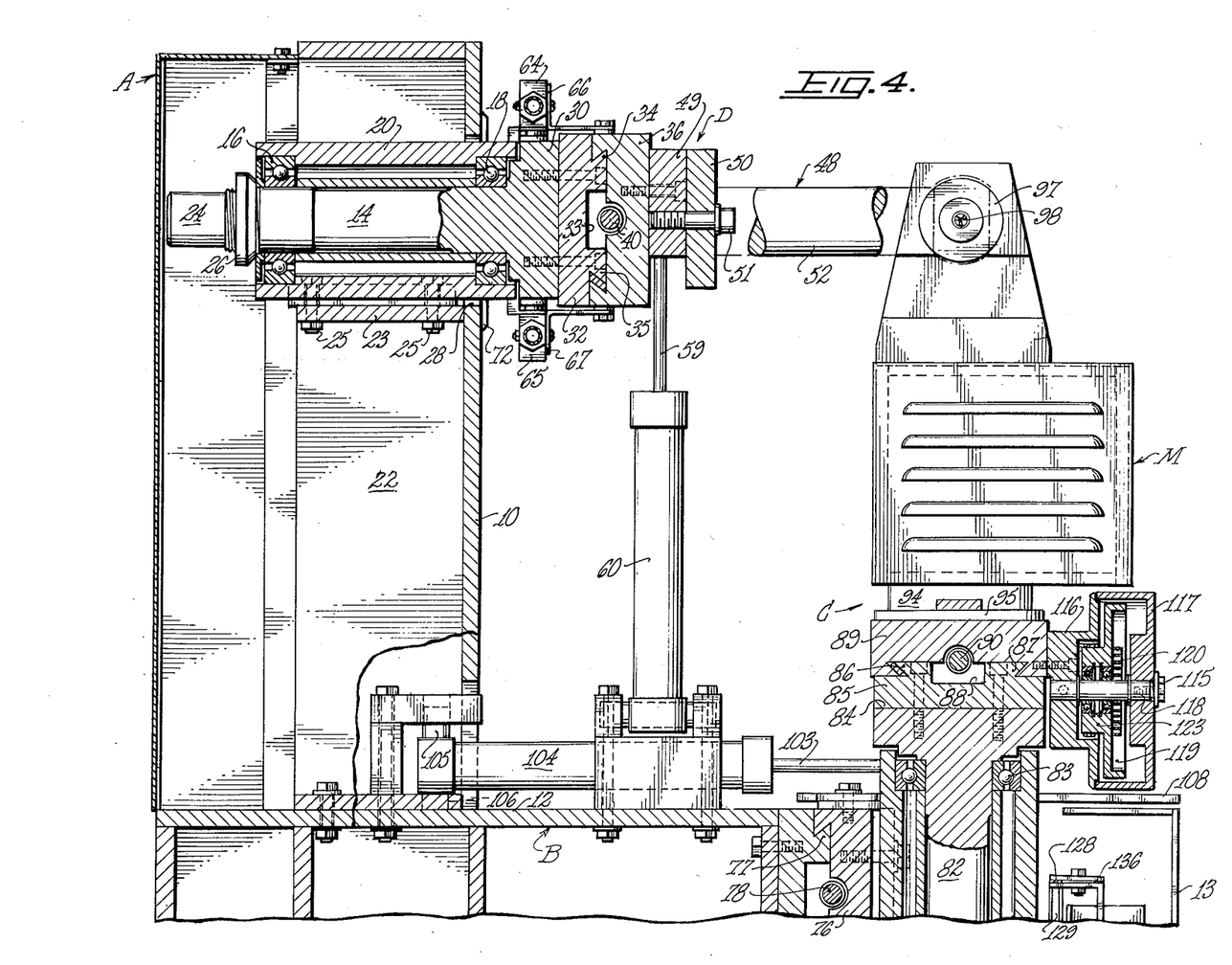
FIG. 4 is a vertical sectional view of the machine taken along the staggered line 4—4 of FIG. 1, with parts broken away and others appearing in elevation.

The lap milling assembly here illustrated includes a composite housing or cabinet consisting of an upstanding section A and a lower, transverse section B (FIGS. 3, 4) which jointly present an open L-shaped cubic area formed by the upright wall 10 of Section A and the horizontal top shelf 12 of Section B which is disposed generally perpendicular thereto. The cooperating elements project into or are located in this open work area, the rotary cutting unit C being upstanding from the horizontal support 12 and the lap carrying unit D projecting transversely from the vertical support wall 10 with the end of each facing the other and being adjustably mounted so that they may be brought together in operative engagement when set for various spacial arrangements corresponding to the lap pattern to be formed.

The lap carrying or positioning unit D is carried by a horizontally disposed, rotary shaft 14 (FIG. 4) which is journalled in a pair of ball bearing raceways 16, 18 which are retained within a mounting tube 20, the latter being supported jointly within the housing tower A by an internal, upright strut 22 and outwardly by an apertured section of the external wall 10, being anchored between the two by a cross brace 23 and bolts 25. An inward, terminally projecting end segment 24 of the shaft 14 is threaded, and carries a lock collar 26 thereon which is thus tightened against the inner race of the bearing unit 16. The outer end of the mounting tube 20 extends through an annular opening 28 of the wall 10, and the pivot shaft 14 extends further therebeyond, where it is annularly flared to form a flat-ended cylindrical head 30.

Figure 1:
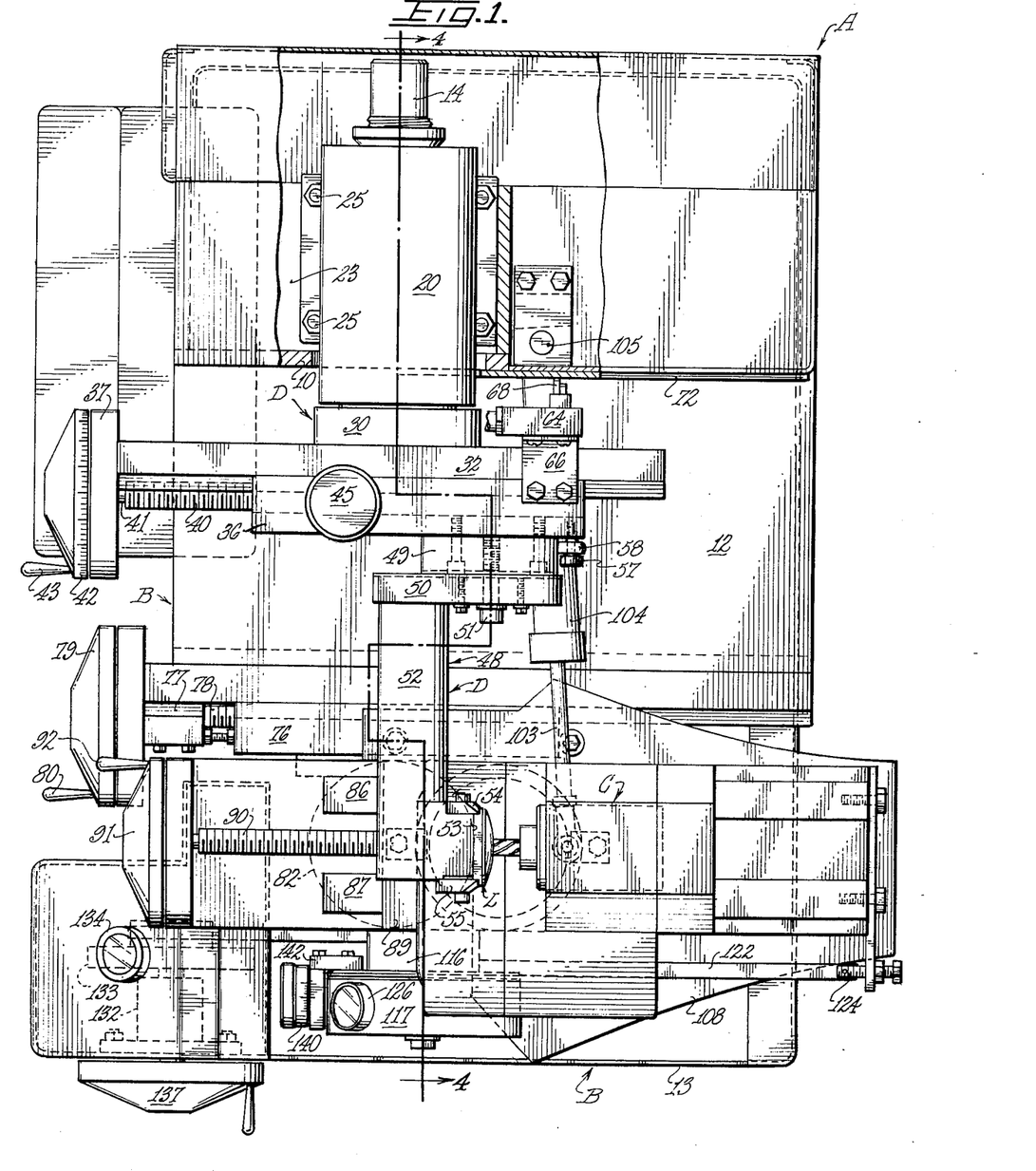
FIG. 1 is a top plan view of a lap milling machine which embodies the present invention, with parts broken away to show internal construction.

Bolted against the outer face of the rotary head 30 is a longitudinal guide plate 32, the outer face of which is formed with a parallel pair of acute-angle or dove-tail transverse slideways 34, 35 which jointly retain a longitudinal slide bar or plate 36 of somewhat lesser length (FIG. 1).

Figure 5:
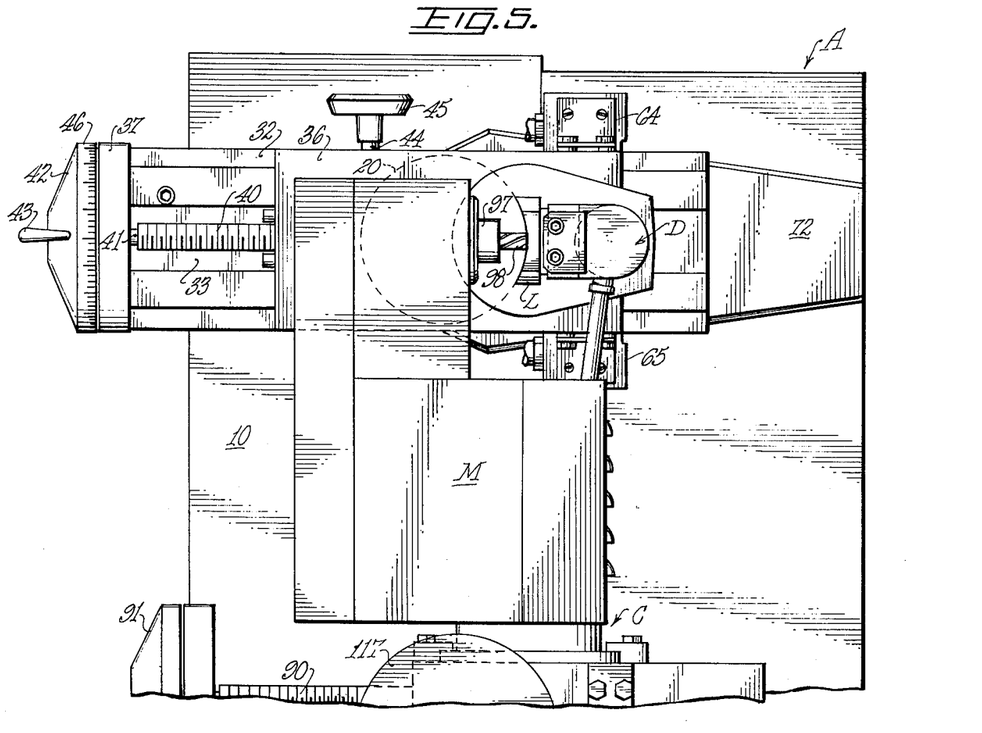
FIG. 5 is an end elevational view similar to FIG. 2 but showing the lap-carrying element and the cutter-carrying post each rotated 180° so as to be able to shape a concave lap instead of a convex one.
Figure 6:
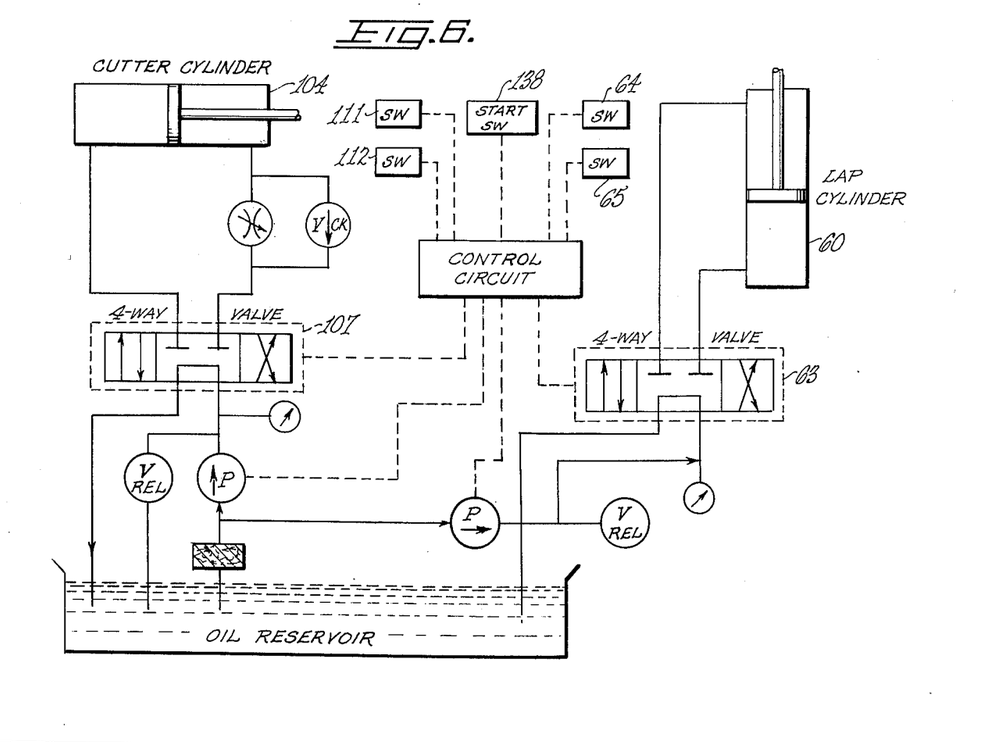
FIG. 6 is a schematic plan of the hydraulic system and its electrical control connections.

The rear or contact face of the slide plate 36 is formed with a longitudinal, medially aligned, incompletely cylindrical bore 38 which laterally opens along an underlying longitudinal channel 33 of the guide plate. A threaded insert 39, typically of brass, is lodged in the bore and a longitudinal screw or worm 40 is threadedly engaged with the insert, with a terminal, unthreaded, stub shaft 41 of the worm rotationally traversing a cylindrical head 37 of the slide plate 36 where it is affixed to a dome shaped, cap or end member 42 having an operating pin or grab handle 43. Accordingly, the slide plate 36 can be moved lengthwise along the slideways 34, 35 by manually rotating the cap 42 in one direction or the other. A locking element is provided by a threaded shaft 44 (FIG. 5) which terminally bears against a jib in the slide channel, and is manually operated by use of the knob 45.

Bolted to the outer face of the slide plate 36 is an L-shaped lap positioning unit 48 consisting of an attachment plate 49, an adjustment plate 50 disposed in juxtaposition thereto and held in selected rotational position about the pivot bolt 51, an outward projecting arm 52, and a perpendicular-directed support bed 53 (FIG. 1) against which a lap L may be fastened by opposing jaws 54, 55 so as to face the cutter unit C. By loosening the pivot bolt 51, the unit carried by adjustment plate 50 can be rotated 180° so as to face the opposite direction (for use when the cutter is also oppositely facing, as subsequently detailed).

Spaced distally along the outer face of the slide plate 36 beyond the attachment plate 49, is a horizontally projecting pivot stud 57 (FIG. 3) which rotatably receives the terminal attachment collar 58 of a piston rod 59 which extends from a generally upstanding, hydraulic cylinder 60. The latter is mounted swingable in a vertical arc by reason of lower, end trunnions 61, 62, and by extension and retraction of the piston rod 59 the lap carrying unit D is movable in a vertical arc about the horizontal axis of the pivot shaft 14. It will be seen that for the same number of degrees of arc, the lineal distance that the lap L will be carried depends upon the amount of its displacement from the axis of shaft 14; however, the vertical height of the lap remains the same and therefor to compensate for the lengthwise displacement, the stroke produced by the hydraulic piston is automatically increased or decreased as the case may be. This is accomplished by a pair of microswitches 64, 65 which are dependent from opposite sides of the slide plate 36 by respective brackets 66, 67. Dependently secured to each microswitch is a hinged contact roller 68, 69, having an angular arm 70, 71 positioned to trigger the particular microswitch. Lengthwise-extending contact means such as a tapered cam plate 72 (FIG. 2) of distally converging side edges is secured to the upright side wall 10 so that its opposite longitudinal edges are contacted in turn by alternate rollers which trigger the respective microswitch to terminate the stroke and reverse the direction of swing of the slide plate 36 and its carried lap L.

The rotary cutter unit C is carried on a longitudinally horizontally disposable undercarriage 76 (FIG. 4) which is lengthwise movable along a slide track 77 by means of a longitudinal worm 78, manually operated by end-attached cap or domehead 79 and its projecting handle 80 as detailed for the similar slide plate 36 earlier. The undercarriage carries an upright or generally vertical pivot shaft 82 supported in a ball bearing raceway 83. To the flat top 84 of the pivot shaft is bolted a guide plate 85 having slideways 86, 87 and longitudinal medial channel 88. A slide plate 89 is longitudinally movable along the slideways by means of a worm 90, manually operated by turning the dome head 91 or handle 92 as in the construction of the lap carrying unit D.

Figure 2:
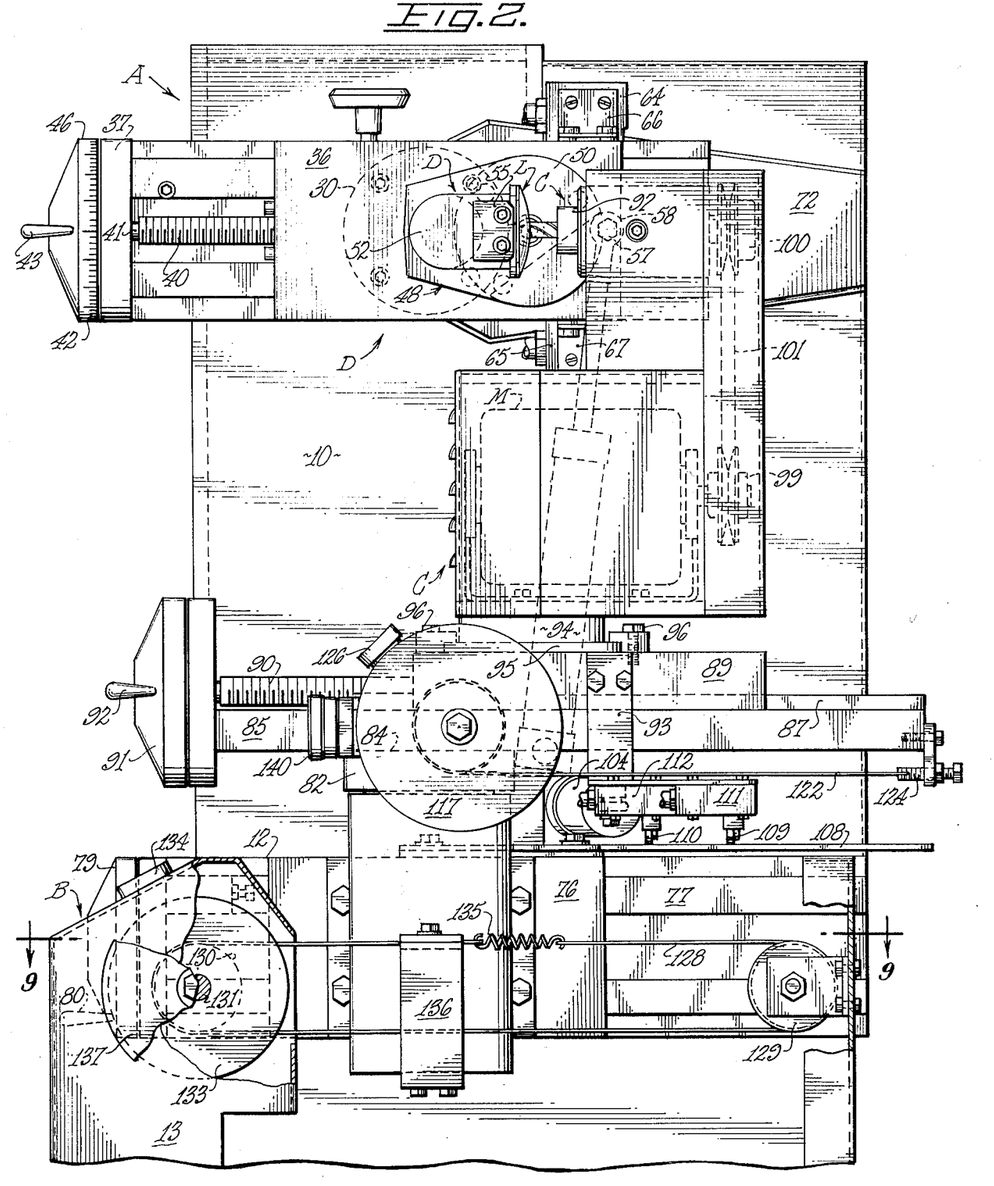
FIG. 2 is an end elevational view as seen from the bottom of FIG. 1.

An upstanding post 94 is mounted atop the slide plate 89 by means of a projecting base plate 95 fastened thereto by a pair of bolts 96 (FIG. 2). The latter may be loosened to permit rotation of the base plate 95 by 180° thereabout so that the post and its carried cutter 98 then face the opposite direction (for use when the lap carrying arm 48 is rotated correspondingly on the pivot bolt 51). Secured to the top face of the post 94 is a housing containing an electric motor M which by pulleys 99, 100 and drive belt 101 (FIG. 2) runs the rotary milling cutter 98 which projects axially from the housing 97.

The slide plate 89 by means of an L-shaped bracket 93 (FIG. 3) extending alongside and spacedly thereunder, is connected by a piston rod 103 to a hydraulic cylinder 104 which is arcuately swingable from the vertical axis of trunnions 105, 106. By action of the hydraulic cylinder, the post 94 and its rotary cutter 98 is oscillated along an arc which is radiused from the axis of the pivot shaft 82. The displacement of the cutter from the pivot shaft 82 is adjusted by operation of the upper worm 90, while the displacement of the cutter positioning unit C is displaceable relative to a vertical plane through the axis of horizontal pivot shaft 14, by operation of the lower worm 78.

The undercarriage 76 also carries — horizontally disposed at a level slightly above the top shelf 12 — lengthwise extending contact means exemplified by a cam plate 108 with distally converging side edges which are disposed alternately to be contacted in succession by a pair of contact rollers 109, 110, each with an associated microswitch 111, 112, dependently carried by the slide plate 89. It will be observed that the shape of the cam plate need not be symmetrical (although it is for the upper cam plate 72); in the present case, both of the rollers and microswitches are located near one side of the cutter-carrying unit C in order to accommodate the connection to the hydraulic chamber 104 from the other side. Consequently the cam plate 108 is configured irregularly in order to compensate for this.

POSITION INDICATION MEANS

Figure 8:
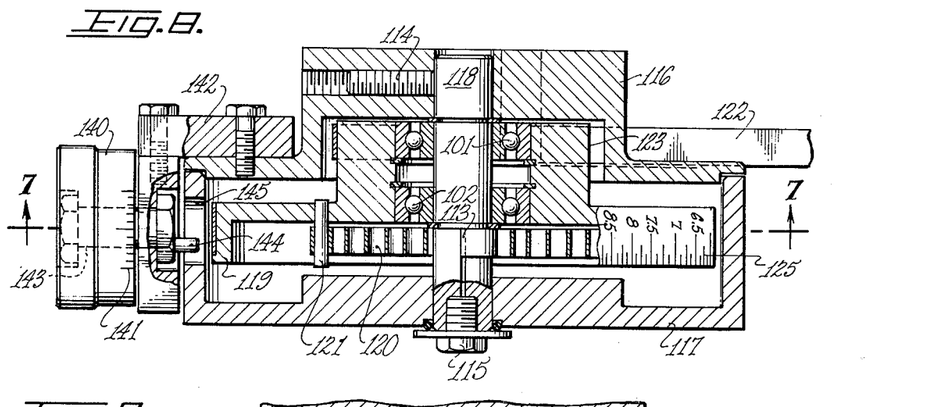
FIG. 8 is a horizontal sectional view taken along the line 8—8 of FIG. 7.

For all of the longitudinally displaceable sub units there are calibration indicia for location and resetting of a position. The cylindrical external area 46 of the upper adjustment cap 42 bears calibration lines which indicate the linear displacement of the lap L from the axis of the pivot shaft 14 (30). The arcuate path or curvature (transverse to the upright face of the lap) to be followed by the rotary cutter 98 is a function of the linear displacement of the cutter from the axis of the vertical pivot shaft 82. It is gaged by the following structure: A laterally projecting block or casting 116 (FIGS. 4 & 8) is secured to the outer side of the horizontal slide plate 89 and supports a hollow cylindrical housing 117 which by an axial end-bolt 115 is mounted for limited rotation on the outer end of a transverse shaft 118 which projects from the casting 116 and is there anchored by a screw 114. Within the hollow housing 117, is a radially stepped reel 119 rotatably disposed on the shaft 118 by ball bearing assemblies 101, 102, and tensioned by a clock spring 120 wound about the shaft 118, with one end fixed to the shaft at 113 and the other end to the reel by the pin 121.

Figure 7:
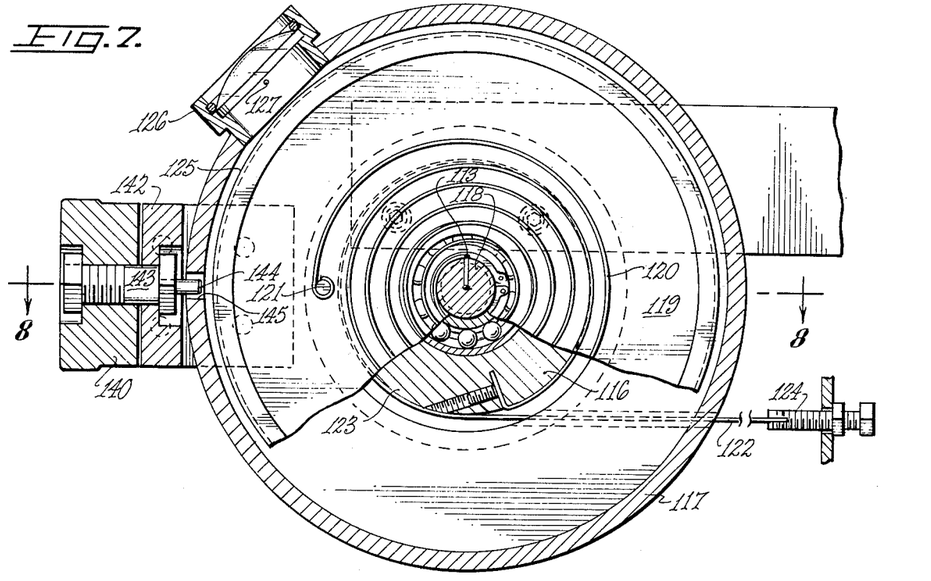
FIG. 7 is a vertical sectional view taken through the cutter position-indicating unit as seen along the line 7—7 of FIG. 8.

A flexible, longitudinal (metal) band 122 (FIGS. 1, 7 & 8) is fastened around the smaller cylindrical surface or hub 123 of the reel, with its stretched-end secured to an attachment clamp 124 at the rear end of the undercarriage or guide plate 85. Accordingly, as the slide plate 89 is moved along the slideway 86, 87, its displacement is measured by the length of the band 122 which is unwound from the cylinder 123. The larger cylindrical portion 125 of the reel has its peripheral surface calibrated in diopters and disposed so as to be readable at a view site 126 provided with an overlying magnifying lens and hair line 127 therebeneath. The larger cylindrical portion 125 of the reel has its peripheral surface located on a diameter which is twice that of the hub 123 which is moved by the band 122, so that movement of the latter is multiplied by a factor of two at the calibrated read-out position (127).

However, the view site 126 with its index line 127 is also — together with the cylindrical housing 117 — rotatably displaceable a small measured amount (relative to the graduations of underlying cylinder 125) so as to compensate for a selected thickness (on the order of a millimeter) of an overlay (not shown) which it may be desired subsequently to cement onto the face of the lap prior to use of the latter in polishing or surfacing a lens, by means of which abrasion from the surfacing operation diminishes the overlay instead of the lap. A rotary operating knob 140 having an adjacent, graduated, cylindrical band 141 is disposed by an L-shaped attachment bracket 142 (FIG. 8) so as to extend radially from the face of the rotatable cylinder 117. An axial shaft 143 of the knob projects an eccentric pin 144 into a slot 145 of the housing cylinder 117, whereby measured turning of the knob and shaft 143 serves to move the cylinder 117 and its index line 127 a corresponding amount.

Figure 9:
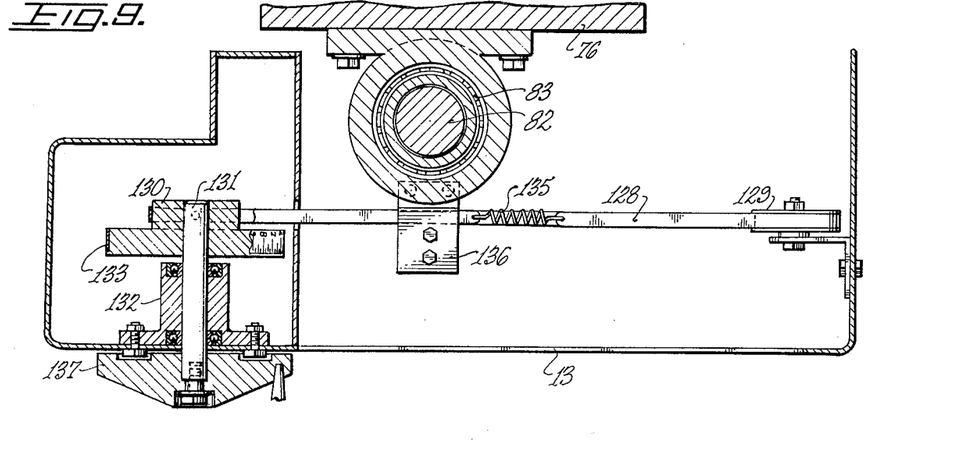
FIG. 9 is a horizontal sectional view taken along the line 9—9 of FIG. 2.

In addition, perpendicular displacement of the horizontal undercarriage 76 from a theoretical vertical plane which is extended lengthwise through the axis of the upper horizontal pivot shaft 14 (30) is measured by an endless band 128 (FIGS. 2 & 9) which at its rear end is led over a fixed pulley 129 and at the forward end is tightly led around a rotatable cylinder 130 (FIG. 9) which in turn is fixed on a longer spindle 131 which also carries a larger indicator cylinder 133 underlying a view site 134. Intermediate its length the band is held together by a tension spring 135 and is carried by a bracket 136 extending from the housing of vertical pivot shaft 82 (84). Accordingly, as the shaft 82 and its carried guideway 86, 87, are moved lengthwise, the band 128 and indicator cylinder 133 are moved correspondingly. The position of the calibrated cylinder 133 can also be manually adjusted. The spindle 131 after passing through a cylindrical bushing 132 extends outward through the end wall 13 of the housing B and carries a manual control knob 137.

The sequence of steps followed in initially positioning the machine for operation is: (1) by means of the worm 78 and operating handle 80, the undercarriage 76 is drawn forward to its stop limit, that is, toward the operator (who is facing the assembly as viewed in FIG. 4); (2) by means of the worm 90 and handle 92, the cutter unit C is then moved away from the stop position the required amount so as to correspond to the desired cross curve of the lap, as read on the calibrated cylinder 125 and viewed at the lens window 126; (3) by the handwheel 137 (FIG. 9) one turns the calibrated cylinder 133 (without it moving the endless band 128) to the selected base curvature which is to be associated, transversely, with the particular cross curve; (4) by worm 78 and handle 80, the undercarriage is then moved to the position just indexed by the handwheel 137; (5) by worm 40 and handle 43, the lap L is moved up against the thus-positioned cutter 98, which lap is then advanced further by the amount of the desired depth of cut, as read by the indicia on the cylindrical band of the head 42.

OPERATION

The lap surfacing machine operates as follows: As noted, the lap positioning unit D with a lap L mounted thereon, oscillates in a generally vertical direction, moved by the action of the lap hydraulic cylinder 60. As the lap positioning unit D oscillates vertically, its carried pair of microswitches 64 and 65 are moved in the same plane and one and the other of their associated pair of contact rollers 68 and 69 ride alternately over the respective longitudinal edges of the lap cam plate 72. Thus, alternate lap trigger signals are produced which are applied to a suitable lap hydraulic valve 63 that thereupon reverses the action of the hydraulic cylinder 60. The unit D thus oscillates between a "home" position and a "set" position in accordance with the lap trigger signals.

The cutter positioning unit C operates in a similar manner, with its rotary cutter 98 oscillating in a generally horizontal plane in response to the action of a cutter hydraulic cylinder 104. The carried pair of microswitches 111 and 112 and dependent pair of contact rollers 109 and 110 ride over the alternate edges of the cutter cam plate 108 and thus produce alternate cutter trigger signals which are applied to a suitable cutter hydraulic valve 107 that thereupon reverses the action of the cutter hydraulic cylinder 104. Thus the cutter positioning unit C similarly oscillates between a home position and a set position in accordance with the cutter trigger signals.

The present design causes the lap positioning unit D to oscillate faster than the cutter positioning unit C, so that the end of the rotary cutter 98 traces a vertically oriented zig-zag path across the surface of the lap L, such zig-zag cutting pattern producing the desired lap surface of the pre-set curvature. There is no locking synchronism between the oscillations of the lap L and the oscillations of the cutter 98, and the advantage of this non-synchronized cutting pattern will be evident hereafter.

In the normal lap surfacing operation, the lap unit D and the cutter unit C ordinarily start from their respective home positions, as by the use of a master switch 138, a pump switch, or a suitable equivalent, the apparatus producing trigger signals as described above. The lap trigger signals are applied through a control circuit (comprising, for example, a relay, a transistor, or the like) to the solenoid of the lap hydraulic valve; and the cutter trigger signals are similarly applied through the control circuit to the solenoid of the cutter hydraulic valve. Thus the lap L and the cutter 98 are each oscillated separately by their associated trigger signals, hydraulic valves, and hydraulic cylinders.

The lap surfacing operation may be most readily terminated on the simultaneous occurrence of a lap home signal and a cutter home signal (as by using a coincident circuit, an AND circuit, or the like to detect this coincident occurrence), the putput of the coincident circuit being used to disable the above mentioned relay or transistor, or the like, or being used to disable the valves, or being used in an equivalent manner. In this way the surfaced lap is stopped at its home position for removal or replacement.

It has been deemed advisable in the present design to terminate the lap surfacing operation as follows: The cutter operation is stopped when the cutter reaches its set position, but the lap is permitted to continue its oscillations until it reaches its home position, whereupon the cutter is permitted to return to its home position. The advantage of this arrangement is that when the cutter has finished its travel and is at its set position, it no longer touches the lap and therefor does not cut the lap any further. The continued oscillations of the lap permit it to resume its home position without any additional cutting; when the lap is safely at its home position, the cutter may then be returned to its home position without further cutting the lap. In this way, the surface of the lap is exposed to a single zig-zag cutting pattern and the return "homing" movements do not produce any additional cutting.

The above termination technique may be achieved in any of a number of ways. For example, a cutter trigger signal may be used to disable the cutter moving apparatus so that the cutter remains at its set position. The next lap home signal may then be used to disable the lap moving apparatus so that the lap remains at its home position, this same lap home signal being used to enable the cutter moving apparatus to return the cutter to the home position. The simultaneous lap and cutter home signals may now be used to hold both the cutter and the lap at their respective home positions and to light an indicator lamp. The control circuitry may utilize relays, transistors, delays, and the like to achieve the results desired for particular usage.

Alternately, the cycle may be terminated when both the lap and the cutter are at their set positions or at any other desired combination of positions.

It will be recalled that the transverse stroke length of each oscillating unit C and D is automatically varied (that is, increased or decreased depending upon the direction of displacement) in the pattern set by the longitudinal edges of the particular cam plates which thus effect a compensation for the linear displacement of the particular unit from its pivot point. Such result is made possible by absence of a locking synchronization between the two units.

CIRCUITRY

Manual Positioning

Figure 10:
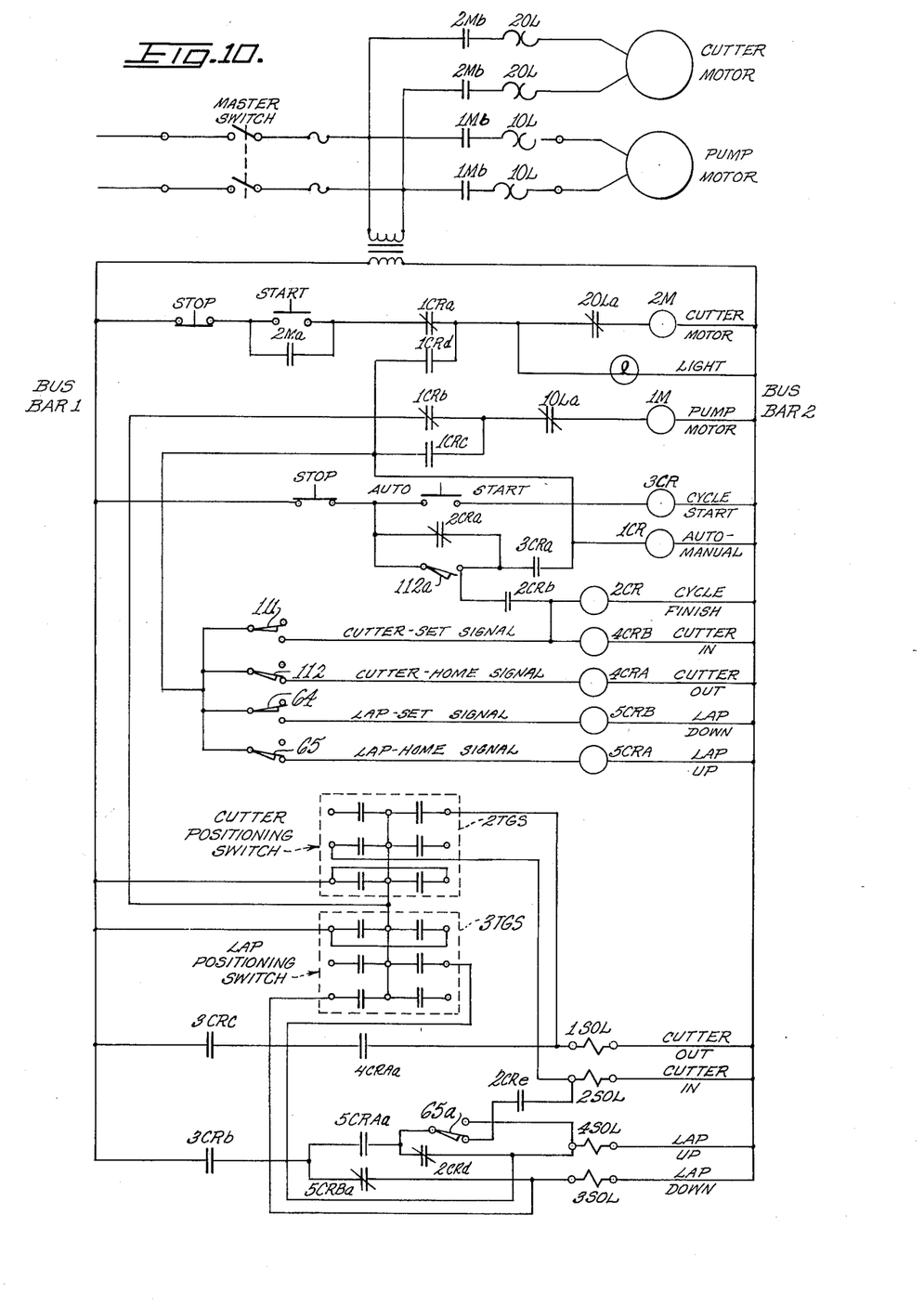
FIG. 10 is a schematic diagram of the electric circuitry.

FIG. 10 shows a typical circuit for controlling the operation of the lap milling machine. In the drawing, the short parallel lines indicate normally-open relay contacts; the short parallel lines interconnected by a slash line indicate normally-closed relay contacts, the relay contacts bearing designations that relate the relay contacts to specific relays.

The operation is initiated by closing a master switch that applies power (through a transformer, if necessary) to the circuit. For ease of explanation, the operation will first be described in terms of manual operation that is used for positioning the lap holding unit and the cutter holding unit.

To achieve such positioning the momentary start switch is pressed. As a result, electric current flows from bus bar 1, through the start switch, through the normally-closed relay contacts ICRa and 20La, and through the coil of relay 2M, this current causing all of the associated relay 2M contacts to change from their normal states to their energised states. It will be noted that the starting switch is shunted by a normally-open relay contact 2Ma of relay 2M, so that the energization of relay 2M thus causes the normally-open shunting contact to close, bypassing the starting switch and providing the electric current that maintains the relay 2M in its energised state.

The cutter motor is energised, in part, through the normally-open relay contacts 2Mb so that the energising of relay 2M closes these contacts and permits electricity to flow to the cutter motor. Thus, the cutter motor and its carried rotary cutter 98 begin to rotate.

It will also be noted that the cutter motor circuit comprises a thermostatic overlaod protection device 20L (also known as a thermal relay), whose normally-closed contacts 20La are part of the circuit that controls relay 2M. In the case of an overload that causes the cutter motor to overheat, the thermostatic safety device 20L causes its contacts 20La to open, and these shut off the cutter motor, as shown by an indicator light.

The cutter is positioned as follows: Electric current flows from bus bar 1 to the other terminals of the lower deck of a positioning toggle switch 2TGS. When this is set either to the right or to the left, electric current flows through its lower deck to the center terminals of its other decks. Moreover, when the cutter-positioning toggle switch 2TGS is set to its right, electric current flows from bus bar 1 through the upper deck to lSol, the first solenoid of the cutter control hydraulic valve; this cutter positioning signal causes the cutter valve to activate the hydraulic cylinder to move the cutter in a "cutter out" direction. The cutter continues to move in this direction as long as the cutter-positioning toggle switch 2TGS is held in its rightward setting. As soon as this switch is released, its self centering action causes it to return to its center setting; the termination of this cutter-positioning signal permits the self-centering hydraulic valve to return to its center position, so that the cutter remains where it was positioned.

When the cutter-positioning toggle switch 2TGS is set to its leftward setting, electric current flows from bus bar 1 through the center deck of the cutter-positioning toggle switch 2TGS to 2Sol, the second solenoid of the cutter control hydraulic valve; this cutter-positioning signal causes the cutter valve to move the cutter in a "cutter in" direction. As above, the cutter will continue to move in this direction as long as the cutter-positioning toggle switch 2TGS is held in its leftward setting. As soon as this switch is released, the cutter remains where it was positioned, for the same reasons as given above. Thus the cutter may be mutually positioned at any desired location of its stroke.

The lap may be positioned at any desired location of its stroke, by similar means, using lap-positioning toggle switch 3TGS and solenoids 3Sol and 4Sol. It will be observed that when either the cutter-positioning toggle switch 2TGS or the lap-positioning toggle switch 3TGS is set in a direction, electric current also flows from the lower deck of the respective switch through the normally-closed relay-contacts 1CR*b* and 10L*a*, and thence through the coil of relay 1M that energises the pump motor in the same manner as described above for the cutter motor. Therefor the positioning toggle switchs 2TGS and 3TGS simultaneously activate the hydraulic pump plus a selected hydraulic valve to produce cutter and/or lap movement.

Automatic Lap-Surfacing

While the lap could be surfaced by means of the manual switch arrangement described above, it is preferrable that the lap-surfacing operation be performed and terminated automatically, and this automatic cycle is produced in a manner that is somewhat similar to that just discussed. For automatic operation, the automatic start switch is depressed momentarily and electric current flows (*a*) from bus bar 1 through the automatic start switch, and through the coil of relay 3CR that starts the automatic cycle by resetting the state of its various relay-contacts 3CR. Electric current also flows (*b*) through the normally-closed relay-contact 2CR*a* and the now-closed relay-contact 3CR*a* to bypass the momentary automatic start switch. Electric current also flows (*c*) through the coil of relay 1CR and the now-closed relay-contacts 1CR*c* and 1CR*d* to start the pump motor and the cutter motor. Electric current also flows (*d*) to the common connection of the several stroke-limiting microswitches 111, 112, 64, and 65.

As earlier described, the stroke-limiting microswitches have their contact rollers riding atop the respective cam plates, and when these cam plates "jog" or drop the rollers the microswitches produce trigger signals that are used to limit the stroke and to reverse the direction of movement of the cutter and the lap. As soon as this direction is (instantaneously) reversed, the contact roller again rides atop the cam plate in the opposite direction. As a result, the trigger signals from the microswitches tend to take the form of short pulses, and as such are used to activate relays that in turn activate the solenoids of the hydraulic valves.

As indicated above, during the surfacing operation the contact rollers are riding atop the cam plates; such state is represented by the microswitches being angled in a slightly upward orientation. However, the schematic diagram shows the microswitches in the states that correspond to the home positions of the cutter and the lap. As indicated, lap microswitch 65 is shown in its downward orientation, so it directs an electric current through the coil of a latching relay 5CRA which thereupon resets its normally-open relay-contacts 5CRA*a*. At this time current flows from bus bar 1 through the now-closed relay-contacts 3CR*b*, 5CRA*a* and 2CR*d* to 4Sol, the first solenoid of the lap hydraulic valve. Therefor the lap moves in a lap-up direction, i.e. away from its home position. At this time the microswitch 65 again rides atop the cam plate and resumes its upwardly angled orientation. The lap-positioning signal is thus terminated, but the lap continues to move in the lap-up direction as long as the relay-contacts 3CR*b* and 5CRA*a* remain closed.

When the lap reaches its finish or set position, the contact roller at lap microswitch 64 drops off the cam plate and produces a lap-positioning signal that energises the coil of relay 5CRB which thereupon closes its relay-contact 5CRB*a* and opens relay-contacts 5CRA*a*. In actuality, relay 5CRA/5CRB is a dual-coil latching relay that acts like a single-pole double-throw switch, so that relay-contacts 5CRA*a* and 5CRB*a* alternately open and close. At the point of time under discussion, relay-contacts 3CRB*b* and 5CRB*a* are closed. As a result, electric current flows from bus bar 1 to 3Sol, the second solenoid of the lap hydraulic valve. Therefor the lap moves in the opposite lap-down direction, i.e. toward its home position. In this way, the lap cutter oscillates between two positions that are established by the microswitches and the longitudinal edges of the cam plate. However, the oscillatory movement of the lap is modified by the cycle-terminating circuit that will be described later.

The cutter may be oscillated in a similar manner, utilizing microswitches 111 and 112, relay-contacts 3CR*c*, relays 4CRA and 4CRB, and solenoids 1Sol and 2Sol. Its oscillation, too, is modified by the cycle terminating circuit now to be described.

Cycle Termination

The preferred surfacing procedure is to have the lap oscillate several times while the cutter moves one forward stroke. The preferred cycle termination is to stop the cutter at its finish, or set position; to permit the lap to return to its home position; to then permit the cutter to return to its home position; and to then terminate the surfacing operation, such cycle-terminating procedure protecting the surfaced lap from further cutting by the cutter.

The cycle-terminating procedure is achieved as follows: While it was implied above that the cutter oscillates between a home position and a set or finish position, this is not actually so in the illustrated circuitry. In actuality, the cutter moves out from its home position — under the influence of microswitch 112, relay-contacts 3CR*c* and 4CRA*ad*1Sol — to reach its set position. Once this set position is reached, the contact roller of microswitch 111 drops off the cam plate to produce a set-position trigger signal. This activates relay 2CR the "cycle finish" relay, and relay 4CRB, relay 2CR changing the state of all its relay contacts, and relay 4CRB acting to reset relay contacts 4CRA*a* — this terminates the outward movement of the cutter but does not act to reverse its direction. Thus the cutter moves out from its home position to its set position and remains there.

It should be noted that when the automatic start switch was initially closed momentarily, a bypass circuit was formed by the normally-closed relay-contacts 2CR*a* and the now-closed relay-contacts 3CR*a*, so that when the automatic starting switch was released the operating circuit remained completed. An auxiliary cutter microswitch 112a is used to bypass the relay contacts 2CRa, and its contact roller (not shown) normally rides on the cam plate. It thus acts to maintain the auxiliary microswitch closed, thus to maintain the bypass condition.

The opening of relay contacts 2CRa breaks the bypass circuit around the automatic starting switch, but the function of the bypass circuit is maintained by the now-closed auxiliary cutter microswitch 112a; moreover, the now-closed relay-contacts 2CRb maintain relay 2CR in its energised state.

At this time, the cutter is being held at its set position, but is prepared to move in whenever the cutter-in circuit is suitably completed. The rest of the circuitry is operative, as discussed above.

It was pointed out that the lap oscillates several times while the cutter moves from its home position to its set position. However, when the cutter reaches and is held at its set position, the lap operation is modified as follows: It will be seen that when the lap was moving up from its home position, its electric circuit used relay contacts 3CRb, 5CRAa, 2CRd and 4Sol. An auxiliary lap microswitch 65a (not shown) was usually closed so as to bypass relay-contacts 2CRd.

When the cutter is being held at its set position, relay 2CR is energised as described above, and the now-open relay-contacts 2CRd become non-conductive. However the upwardly-oriented auxiliary lap microswitch 65a (not shown) maintains the lap-up circuit until the lap reaches its home position. At the lap-up portion of the next oscillation, the auxiliary lap microswitch 65a is in its downward home orientation as shown, and since electric current cannot flow through the now-open relay-contacts 2CRd to 4Sol, the lap cannot move from its home position. The electric current flows instead through the upwardly oriented auxiliary lap microswitch 65a, through the now-closed relay contacts 2CRe to 2Sol of the cutter in circuit. Therefor the lap remains at its home position, and the cutter now moves to its home position. Thus the cutter and the lap are both at their home positions, having arrived in the desired sequence.

When the cutter arrives at its home position, it causes the auxiliary cutter microswitch 112a to drop to its illustrated orientation; this breaks the circuit to the pump motor, to the cutter motor, to the microswitches, and to the relays. Thus the assembly becomes inoperative, with the cutter and the lap both at their home positions. The machine is now ready for changing the lap, making repairs, adjustments, etc.

Under some conditions, it may be desirable for relay 1CR to be a time delay or a slow acting relay for the following reason: When the cycle terminates as described above, relay 1CR is de-energised along with the other relays. Thus, relay-contacts 1CRa return to their normally-closed position as indicated. If their return is too fast, the circuit to the cutter motor (using bus bar 1, relay-contacts 2Ma and 1CRa, and the coil of relay 2M) may be re-established, and under this condition the cutter motor may continue to operate. The described relay would prevent this.

We claim:

1. In a lap surfacing machine having a lap positioning unit and a cutter positioning unit jointly adapted in operation to dispose an associated lap and cutter in mutual engagement, each unit being separately pivotally oscillatable in different transverse directions by transverse arcuate strokes each radiused from a respective pivot axis, and each unit initially being selectively displaceable radially from its respective pivot axis along substantially parallel paths in accordance with a chosen pattern of longitudinal and transverse curvatures to be formed on the lap by the cutter, the improvement comprising:

guide means extending lengthwise along each of said generally parallel paths, each guide means comprising a longitudinal edge disposed distally converging toward a midline of its respective longitudinal path, and sensory means carried by each of said oscillatory units, operating and associated switch means responsive to proximity of said sensory means to said longitudinal edge at the end of an arcuate stroke and effective thereby to reverse the direction of oscillation of the unit and to diminish successive stroke lengths with progressive convergence of the longitudinal edge in accordance with amount of radial displacement of the sensory means from the pivot axis.

2. A lap surfacing machine according to claim 1 wherein said guide means comprise a cam plate and said sensory means comprise roller contact means.

3. A lap surfacing machine according to claim 1 wherein the pivot axis, guide means and sensory means of one positioning unit are selectively displaceable in unison along its particular path relative to the pivot axis of the other positioning unit.

4. A lap surfacing machine according to claim 3 which additionally includes calibrated indicating means for determining the linear displacement each of the lap positioning unit and the cutter positioning unit from their respective pivot axis, and for determining the amount of displacement of the displaceable pivot axis, and additionally for adjusting the lap position to compensate for a selected thickness of a lap overlay which may subsequently be used with said lap.

5. A lap surfacing machine according to claim 1 wherein said oscillatable units are each operable at a substantially constant speed by hydraulic means responsive to said switch means for directional reversal.

6. A lap surfacing machine according to claim 1 wherein the respective lap positioning unit and cutter positioning unit are each selectively rotatable 180° about an axis generally perpendicular to the radial path, whereby the machine can selectively cut either concave or convex laps depending upon the direction faced by the opposing lap and cutter.

7. A lap surfacing machine according to claim 1 wherein the cutter positioning unit carries a rotary milling cutter, functionally disposable in end abutment with the lap face of the lap positioning unit.

8. A lap surfacing machine according to claim 1 including operating means, comprising separate hydraulic units, for effecting said separate oscillating of said lap positioning unit and said cutter positioning unit;
   electrical means, including said associated switch means, for activating said operating means;
   said electrical means including means for causing trigger signals from said switch means associated with said lap positioning unit to control the hydraulic unit associated with the lap positioning unit, for controlling the stroke length and for reversing the direction of movement of said oscillating lap positioning unit;

said electrical means further including means for causing trigger signals from said switch means associated with the cutter positioning unit to control the hydraulic unit associated with the cutter positioning unit, for controlling the stroke length and for reversing the direction of movement of said oscillating cutter positioning unit, whereby simultaneous operation of said separate oscillations thus establishes the surfacing pattern chosen for said lap surfacing machine.

9. The lap surfacing machine of claim 8 wherein said electrical means further includes terminating means responsive to completion of said chosen pattern as manifest by a lap home signal and a cutter home signal.

10. A lap surfacing machine having a lap positioning unit and a cutter positioning unit jointly adapted in operation to dispose an associated lap and cutter in mutual engagement, and pivotally oscillating in transverse planes so as to form a predetermined pattern of longitudinal and transverse curvature on an engaged face of the lap by the cutter, said cutter comprising a transversely oscillatable rotary milling cutter thus disposable in end abutment with and substantially perpendicular to the face of the oscillatablelap, each unit comprising a reciprocably rotatably pivot shaft upstanding from a different one of said planes and each carrying a transverse support member having longitudinal track means extending radially from the pivot shaft and carrying a slide element supporting the respective lap or cutter for oscillation by arcuate movement of the support member by its pivot shaft, means for oscillating each pivot shaft and means for varying the oscillation stroke length of each unit in accordance with the linear displacement of the respective slide element from its pivot shaft.

11. A lap surfacing machine according to claim 10 wherein the means for oscillating said cutter positioning unit comprises hydraulic means which oscillates said cutter at a substantially constant speed, whereby the rotary milling cutter is effective in cutting the lap while moving in each direction of an oscillation stroke.

12. A lap surfacing machine according to claim 10 including operating means, comprising separate hydraulic units for effecting said separate oscillating of said lap positioning unit and said cutter positioning unit, trigger means for reversing the direction of movement of each oscillating unit at the end of a stroke and associated means for adjusting the stroke length of each unit in response to the amount of displacement from its pivot shaft.

13. A lap surfacing machine according to claim 10 which additionally includes calibrated indicating means for determining the linear displacement each of the lap and the cutter from their respective pivot shafts, means for selectively displacing one of said units and pivot shafts along its plane relative to the other pivot shaft and for determining the amount of displacement of said displaceable pivot shaft, and additionally for adjusting the lap position to compensate for a selected thickness of a lap overlay which may be used with said lap.

14. A lap surfacing machine according to claim 10 wherein the means for varying the oscillation stroke length of each unit includes contact means fixedly disposed lengthwise adajcent the oscillatable track means, and a trigger element carried by said slide element and adapted upon oscillation of the support member to effect stroke reversal by reason of proximity to the portion of said contact means which is immediately adjacent thereto as a consequence of the initial radial displacement setting of the slide element from its pivot shaft.

* * * * *